US012783346B2

(12) United States Patent
Kapinos et al.

(10) Patent No.: US 12,783,346 B2
(45) Date of Patent: Nov. 3, 2026

(54) DATA RECOVERY USING ARTIFICIAL INTELLIGENCE MODEL

(71) Applicant: Lenovo Global Technology (United States) Inc., Morrisville, NC (US)

(72) Inventors: Robert J. Kapinos, Durham, NC (US); Scott Li, Cary, NC (US); Robert James Norton, Jr., Raleigh, NC (US); Igor Stolbikov, Apex, NC (US)

(73) Assignee: Lenovo Global Technology (United States) Inc., Morrisville, NC (US)

( * ) Notice: Subject to any disclaimer, the term of this patent is extended or adjusted under 35 U.S.C. 154(b) by 16 days.

(21) Appl. No.: 19/095,662

(22) Filed: Mar. 31, 2025

(65) Prior Publication Data

US 2026/0300080 A1 Oct. 1, 2026

(51) Int. Cl.
*G06F 11/07* (2006.01)

(52) U.S. Cl.
CPC ...... *G06F 11/0793* (2013.01); *G06F 11/0727* (2013.01)

(58) Field of Classification Search
CPC ............. G06F 11/0793; G06F 11/0727; G06F 11/1446; G06F 11/073; G06F 11/0745; G06F 11/1435
USPC ...................................................... 714/15, 6.1
See application file for complete search history.

(56) References Cited

U.S. PATENT DOCUMENTS

| | | | | |
|---|---|---|---|---|
| 2023/0326468 | A1* | 10/2023 | Xiong | G10L 19/005 |
| 2024/0037388 | A1* | 2/2024 | Natsumeda | G06N 20/10 |
| 2024/0046141 | A1* | 2/2024 | Chae | G06N 3/084 |
| 2025/0190308 | A1* | 6/2025 | Galvin | G06F 11/1402 |

* cited by examiner

*Primary Examiner* — Chae M Ko
(74) *Attorney, Agent, or Firm* — FERENCE & ASSOCIATES LLC

(57) ABSTRACT

One embodiment provides a method, the method including: receiving, at an artificial intelligence model of a data recovery system, data of a data storage medium including incomplete stored data; identifying, using the data recovery system, gaps in the data of the data storage medium; and generating, using the artificial intelligence model, a set of data corresponding to a more complete set of the incomplete stored data by adding data predictions, generated by the artificial intelligence model, for the gaps in the data to the incomplete stored data. Other aspects are claimed and described.

20 Claims, 4 Drawing Sheets

DATA RECOVERY USING ARTIFICIAL INTELLIGENCE MODEL

BACKGROUND

Many devices utilize data storage mediums (e.g., solid state storage devices, flash memory, network storage devices, cloud storage devices, etc.). The devices can store not only user generated files, but also files that are necessary for the operation of the device itself. For example, the data storage medium might store application files, executable files, machine-readable files, and/or the like. Additionally, some data storage mediums are standalone, such that they are not installed within or integral to an information handling device. For example, external hard drives, flash drives, magnetic storage mediums, optical storage mediums, and even some of the network storage devices are devices that do not have any capabilities other than the storage of data. Regardless of the location of the data storage medium with respect to a computing device, the ability to save data for later use is critical to most information handling devices and users thereof.

BRIEF SUMMARY

In summary, one aspect provides a method, the method including: receiving, at an artificial intelligence model of a data recovery system, data of a data storage medium including incomplete stored data; identifying, using the data recovery system, gaps in the data of the data storage medium; and generating, using the artificial intelligence model, a set of data corresponding to a more complete set of the incomplete stored data by adding data predictions, generated by the artificial intelligence model, for the gaps in the data to the incomplete stored data.

Another aspect provides a system, the system including: a processor; a memory device that stores instructions that, when executed by the processor, causes the system to: receive, at an artificial intelligence model of a data recovery system, data of a data storage medium including incomplete stored data; identify, using the data recovery system, gaps in the data of the data storage medium; and generate, using the artificial intelligence model, a set of data corresponding to a more complete set of the incomplete stored data by adding data predictions, generated by the artificial intelligence model, for the gaps in the data to the incomplete stored data.

A further aspect provides a product, the product including: a computer-readable storage device that stores executable code that, when executed by a processor, causes the product to: receive, at an artificial intelligence model of a data recovery system, data of a data storage medium including incomplete stored data; identify, using the data recovery system, gaps in the data of the data storage medium; and generate, using the artificial intelligence model, a set of data corresponding to a more complete set of the incomplete stored data by adding data predictions, generated by the artificial intelligence model, for the gaps in the data to the incomplete stored data.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

Figure 1:
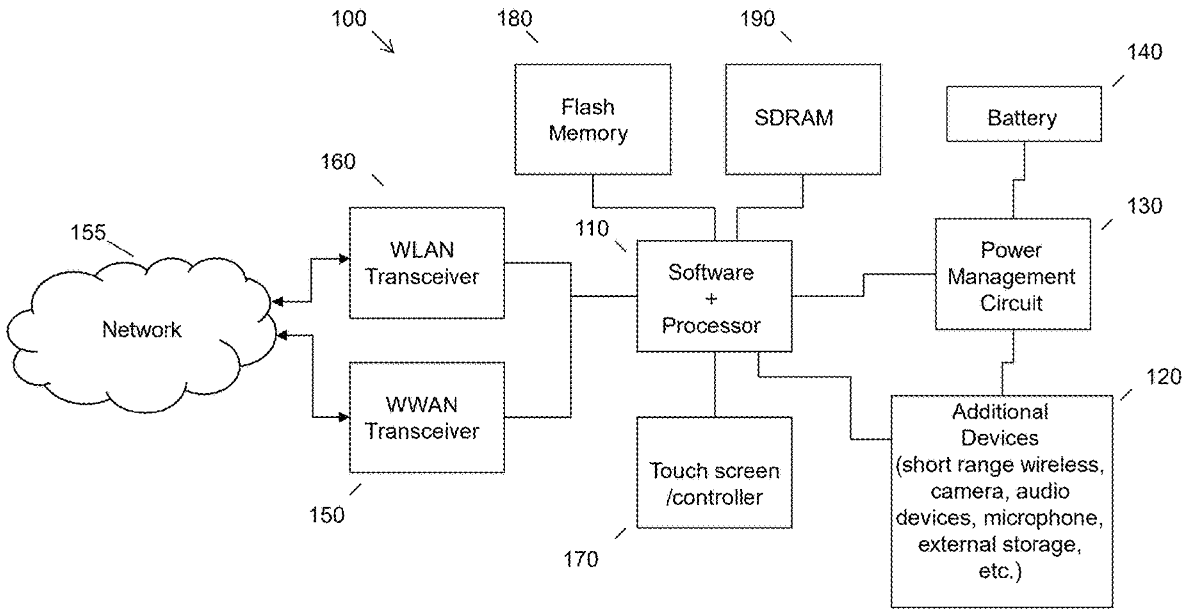
FIG. 1 illustrates an example of information handling device circuitry.

While data storage mediums are very convenient when they work properly, when the data on a data storage medium becomes damaged or corrupted, it can be impossible to recover the data, which can be extremely frustrating to users and can cause information handling devices or systems to fail to function properly. Data on a data storage medium can end up having gaps, discontinuities, corruption points, and/or the like. This results in the files being unreadable by the computing system, thereby resulting in the failures of files, systems, and devices. Additionally, data may not be saved on the data storage medium, for example, a user may be working on a file and a device failure may mean that the user did not get to save the latest version of the file. Again, the user is unable to access the latest version of the file and, generally has to settle for the previous version which may have varying degrees of recency depending on saving habits of the user, save settings of the application, and/or the like.

Traditional techniques for recovering data from a data storage medium having missing data, including data that was not saved properly, data that is corrupted, data that is damaged, data having gaps, data having discontinuities, data having corruption points, and/or the like, suffer from deficiencies and/or drawbacks. Some techniques include proactive techniques that are performed before data is made incomplete on a data storage medium. One such traditional technique is that extra copies of the data are saved automatically with an automatic redundancy. A user may also manually save multiple copies of the data in different locations. However, having redundant data is time and storage intensive. It takes time to create and save the redundant versions of the data, particularly if it is a file that is often modified. Additionally, redundant data saves require additional data storage resources.

A similar technique is journaling where a record of writes is saved on other media, so that the writes can be reconstructed after a power loss. This still is time and storage intensive, albeit not to the same extent as the redundancy technique. Another technique is a restoration bits (parity) technique where mathematically validatable checks for each byte are stored so they can be recreated upon a partial loss of data. This is computationally expensive and also performs poorly on write actions.

Some traditional techniques include reactive techniques that are performed after data is made incomplete on a data storage medium. These are generally referred to as data recovery techniques as they are attempting to recover lost data. Some of these techniques include, but are not limited to, low-level analysis of file systems, determined read, and an artificial intelligence (AI) technique for file block analysis. The low-level analysis of file systems includes analyzing the file system of a corrupt or damaged data storage medium, so that data can be reconstructed without any table of contents or index. However, this only focuses on the file system and is unable to be utilized to restore files.

The determined read technique includes reading the data storage medium many times redundantly. Different data reads may be able to read different data at the time of the read. The results are averaged to make a best reconstruction. In the AI technique, the AI uses file structures to attempt to recreate the data. However, this only works for a lost file index and does not work if large portions of the data are lost or if there are discontinuities. Additionally, this technique does nothing if the system structures are intact, but the data is gone. Thus, the traditional reactive techniques do not result in a complete or effective reconstruction of data from a damaged data storage medium.

Accordingly, the described system and method provides a technique for generating a more complete set of data from an incomplete set of data utilizing an artificial intelligence model to identify gaps in the data and generate predictions of data to be used to fill the identified gaps. The data recovery system utilizes an artificial intelligence model to receive data of a data storage medium that includes incomplete stored data. The data storage medium may be a damaged data storage medium and the incomplete stored data may include data that has damaged portions, data that has corrupted portions, data having gaps, data having discontinuities, and/or the like. The data recovery system can identify the gaps in the data on the data storage medium. For example, the system can identify gaps in the data based upon received recovered data, the model can predict where the gaps in the data are, and/or the like.

The artificial intelligence model can then generate a set of data that is a more complete than the incomplete stored data of the data storage medium. The artificial intelligence model generates this more complete data by making predictions for the gaps in the data. In other words, the model can identify the gaps and then make predictions regarding what data could be used to fill in the gaps to make a more complete set of data that functions as the original set of data that was damaged. The artificial intelligence model is a trained model that is trained using high-level (e.g., files, contents of files, etc.) and low-level (disk data stream, etc.) data information. To make the predictions of the data, the AI model can additionally utilize any data that was recovered using traditional data recovery techniques.

Therefore, a system provides a technical improvement over traditional methods for data recovery. The described system provides an improvement to the data storage and access technological field. Unlike traditional reactive data recovery techniques, the described system provides a technique to more completely recover data on a damaged data storage medium. Additionally, the described system works to recover data as opposed to simply system structures, thereby providing a more complete recovery of the data.

The illustrated example embodiments will be best understood by reference to the figures. The following description is intended only by way of example, and simply illustrates certain example embodiments.

While various other circuits, circuitry or components may be utilized in information handling devices, with regard to smart phone and/or tablet circuitry 100, an example illustrated in FIG. 1 includes a system on a chip design found for example in tablet or other mobile computing platforms. Software and processor(s) are combined in a single chip 110. Processors comprise internal arithmetic units, registers, cache memory, busses, input/output (I/O) ports, etc., as is well known in the art. Internal busses and the like depend on different vendors, but essentially all the peripheral devices (120) may attach to a single chip 110. The circuitry 100 combines the processor, memory control, and I/O controller hub all into a single chip 110. Also, systems 100 of this type do not typically use serial advanced technology attachment (SATA) or peripheral component interconnect (PCI) or low pin count (LPC). Common interfaces, for example, include secure digital input/output (SDIO) and inter-integrated circuit (I2C).

There are power management chip(s) 130, e.g., a battery management unit, BMU, which manage power as supplied, for example, via a rechargeable battery 140, which may be recharged by a connection to a power source (not shown). In at least one design, a single chip, such as 110, is used to supply basic input/output system (BIOS) like functionality and dynamic random-access memory (DRAM) memory.

System 100 typically includes one or more of a wireless wide area network (WWAN) transceiver 150 and a wireless local area network (WLAN) transceiver 160 for connecting to various networks 155 (e.g., telecommunications networks, wireless Internet devices (e.g., access points), cloud networks, remote networks, local networks, etc.). Additionally, devices 120 are commonly included, e.g., a wireless communication device, external storage, camera, microphone, external storage, etc. System 100 often includes a touch screen 170 for data input and display/rendering. System 100 also typically includes various memory devices, for example flash memory 180 and synchronous dynamic random-access memory (SDRAM) 190.

Figure 2:
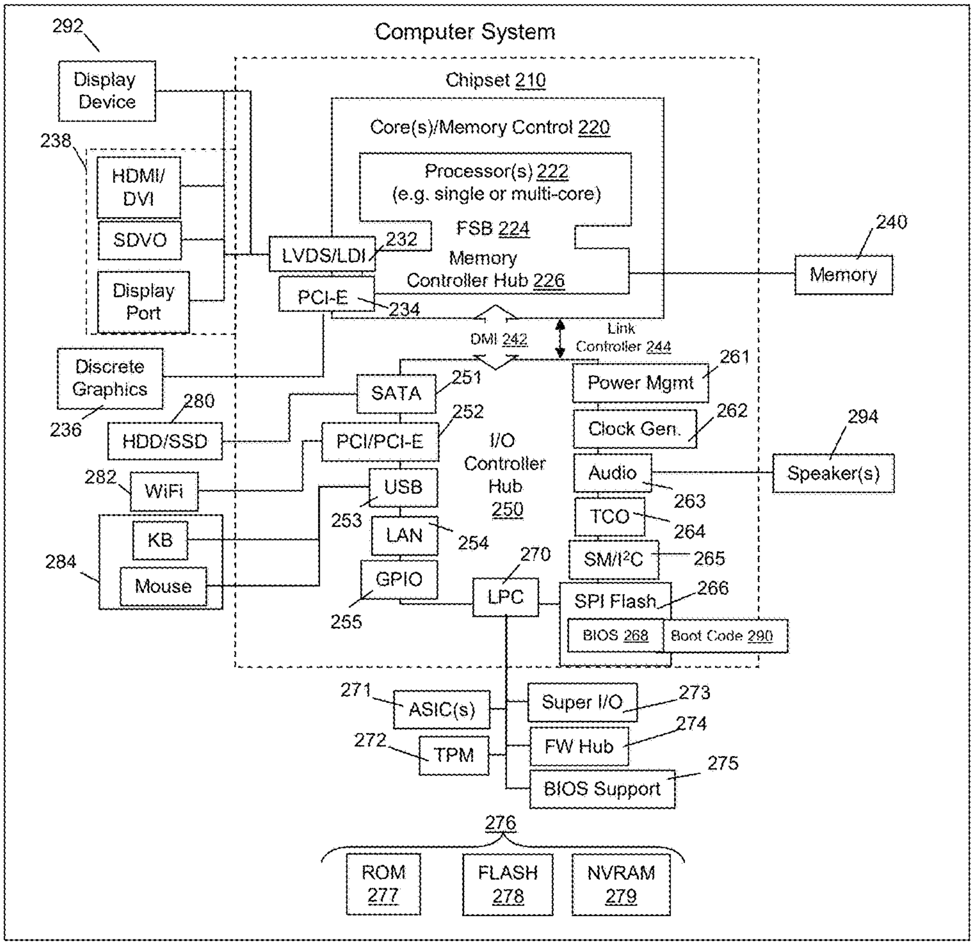
FIG. 2 illustrates another example of information handling device circuitry.

FIG. 2 depicts a block diagram of another example of information handling device circuits, circuitry, or components. The example depicted in FIG. 2 may correspond to computing systems such as personal computers, or other devices. As is apparent from the description herein, embodiments may include other features or only some of the features of the example illustrated in FIG. 2.

The example of FIG. 2 includes a so-called chipset 210 (a group of integrated circuits, or chips, that work together, chipsets) with an architecture that may vary depending on manufacturer. The architecture of the chipset 210 includes a core and memory control group 220 and an I/O controller hub 250 that exchanges information (for example, data, signals, commands, etc.) via a direct management interface (DMI) 242 or a link controller 244. In FIG. 2, the DMI 242 is a chip-to-chip interface (sometimes referred to as being a link between a “northbridge” and a “southbridge”). The core and memory control group 220 include one or more processors 222 (for example, single or multi-core) and a memory controller hub 226 that exchange information via a front side bus (FSB) 224; noting that components of the group 220 may be integrated in a chip that supplants the conventional “northbridge” style architecture. One or more processors 222 comprise internal arithmetic units, registers, cache memory, busses, I/O ports, etc., as is well known in the art.

In FIG. 2, the memory controller hub 226 interfaces with memory 240 (for example, to provide support for a type of random-access memory (RAM) that may be referred to as “system memory” or “memory”). The memory controller hub 226 further includes a low voltage differential signaling (LVDS) interface 232 for a display device 292 (for example, a cathode-ray tube (CRT), a flat panel, touch screen, etc.). A block 238 includes some technologies that may be supported via the low-voltage differential signaling (LVDS) interface 232 (for example, serial digital video, high-definition multimedia interface/digital visual interface (HDMI/DVI), display port). The memory controller hub 226 also includes a PCI-express interface (PCI-E) 234 that may support discrete graphics 236.

In FIG. 2, the I/O hub controller 250 includes a SATA interface 251 (for example, for hard-disc drives (HDDs), solid-state drives (SSDs), etc., 280), a PCI-E interface 252 (for example, for wireless connections 282), a universal serial bus (USB) interface 253 (for example, for devices 284 such as a digitizer, keyboard, mice, cameras, phones, microphones, storage, other connected devices, etc.), a network interface 254 (for example, local area network (LAN)), a general purpose I/O (GPIO) interface 255, a LPC interface 270 (for application-specific integrated circuit (ASICs) 271, a trusted platform module (TPM) 272, a super I/O 273, a firmware hub 274, BIOS support 275 as well as various types of memory 276 such as read-only memory (ROM) 277, Flash 278, and non-volatile RAM (NVRAM) 279), a power management interface 261, a clock generator interface 262, an audio interface 263 (for example, for speakers 294), a time controlled operations (TCO) interface 264, a system management bus interface 265, and serial peripheral interface (SPI) Flash 266, which can include BIOS 268 and boot code 290. The I/O hub controller 250 may include gigabit Ethernet support.

The system, upon power on, may be configured to execute boot code 290 for the BIOS 268, as stored within the SPI Flash 266, and thereafter processes data under the control of one or more operating systems and application software (for example, stored in system memory 240). An operating system may be stored in any of a variety of locations and accessed, for example, according to instructions of the BIOS 268. As described herein, a device may include fewer or more features than shown in the system of FIG. 2.

Information handling device circuitry, as for example outlined in FIG. 1 or FIG. 2, may be used in devices such as tablets, smart phones, personal computer devices generally, and/or electronic devices, which may be devices used in the data recovery system, that house or provide access to the data recovery system, and/or the like. For example, the circuitry outlined in FIG. 1 may be implemented in a tablet or smart phone embodiment, whereas the circuitry outlined in FIG. 2 may be implemented in a personal computer embodiment.

Figure 3:
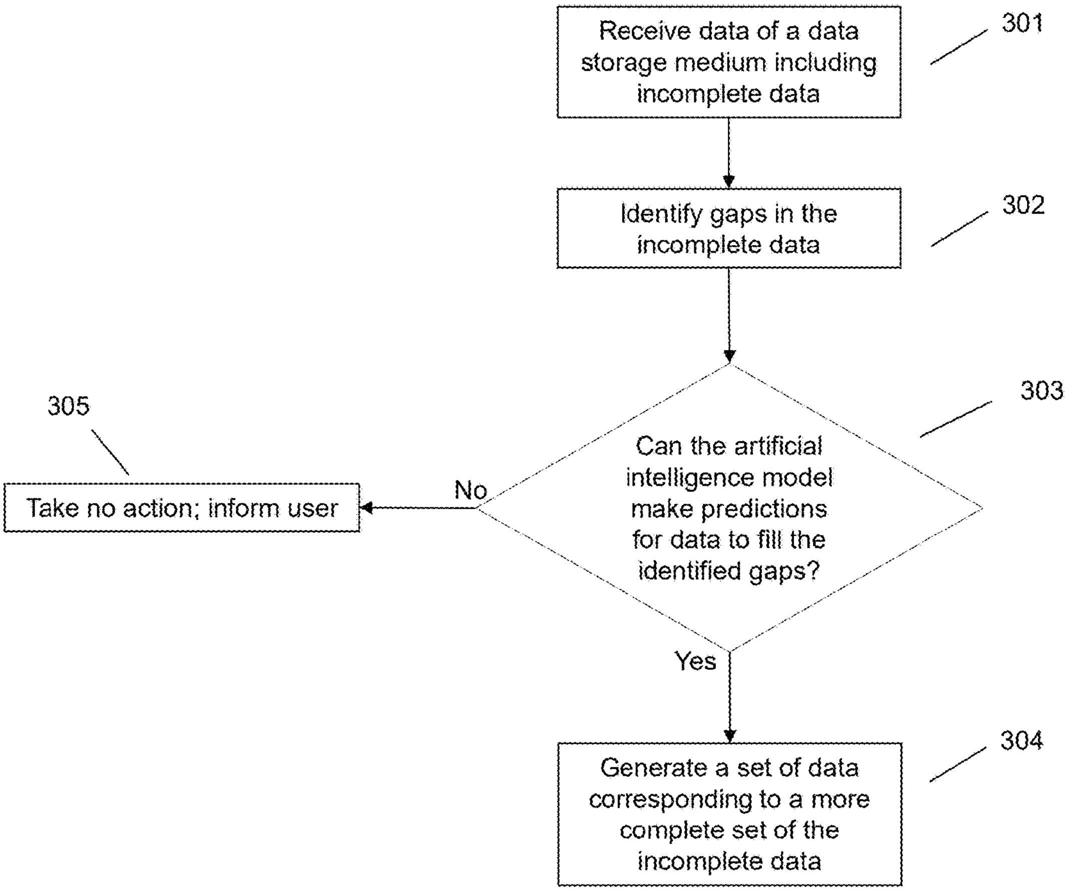
FIG. 3 illustrates an example method for generating a more complete set of data from an incomplete set of data utilizing an artificial intelligence model to identify gaps in the data and generate predictions of data to be used to fill the identified gaps.

FIG. 3 illustrates an example method for generating a more complete set of data from an incomplete set of data utilizing an artificial intelligence model to identify gaps in the data and generate predictions of data to be used to fill the identified gaps. The method may be implemented on a system which includes a processor, memory device, output devices (e.g., display device, printer, etc.), input devices (e.g., keyboard, touch screen, mouse, microphones, sensors, biometric scanners, etc.), image capture devices, and/or other components, for example, those discussed in connection with FIG. 1 and/or FIG. 2. While the system may include known hardware and software components and/or hardware and software components developed in the future, the system itself is specifically programmed to perform the functions as described herein to generate a more complete set of data for a damaged data storage medium using an artificial intelligence model. Additionally, the data recovery system includes modules and features that are unique to the described system.

The data recovery system may be activated in order to recover data on a data storage medium that has been lost, which may be due to damaged data, improperly saved data, data having gaps, data having discontinuities, and/or the like. The data recovery system utilizes an artificial intelligence model that may be trained on high-level and low-level data information. The artificial intelligence model can take the data that is still accessible on the data storage medium and predict the gaps in the data and then predict data that can be used to fill in the gaps in a way that makes the recovered data function as the original data, if accessible, would have functioned. In other words, the artificial intelligence model may not be able to recreate the data exactly as it was intended or originally saved, but instead attempts to recreate the data in a manner that allows the data to perform the function that was intended with the original data.

Activation of the data recovery system may be a manual activation of the data recovery system and/or an automatic activation of the data recovery system. Manual activation of the system may include a user opening an application associated with the data recovery system, the user accessing the computing system associated with the data recovery system, and/or the user otherwise providing input to the data recovery system. The automatic activation of the data recovery system may be based upon the detection of a trigger event indicating that the system should be activated. Example trigger events include the detection of receipt of a data storage medium having lost or incomplete data, detection, a user accessing an application that interfaces with the data recovery system, activation of software or an application utilizing the data recovery system, and/or the like.

The data recovery system may be made of multiple systems or modules that communicate together to make up the data recovery system or may be a single system. The data recovery system may be a standalone system, may be accessible through other computing devices, and/or a combination thereof. For example, the data recovery system may be a standalone system that can be accessed by a user and/or may be or provide an application that is accessible by a user on another computing device. The data recovery system may be accessible using any type of computing device, for example, personal computer, laptop computer, smartphone, tablet, smartwatch, head-mounted display, smart television or other smart appliance, augmented reality device, virtual reality device, and/or the like.

Thus, the data recovery system may be accessible locally using a computing device where the data recovery system is installed and/or may be accessible remotely through another computing device. For example, the data recovery system may be accessed by a user using a device that communicates with the data recovery system to recover data from incomplete data on a data storage medium, to identify gaps within data of a data storage medium, to generate more complete sets of data as compared to the incomplete data, and/or the like. However, the data recovery system may be located and operate on a different information handling device to perform the described steps. In other words, the user may access a device housing the data recovery system or may access a device that communicates with a device housing the data recovery system.

The data recovery system can be provided as a service to other entities or companies. In other words, the data recovery system could be stored on a server or network of a company and the system may receive data of a data storage medium that is incomplete or at least partially inaccessible, with the other companies or entities paying for data recovery or use of the data recovery system. For example, a company or user may allow the service provider access to data storage mediums that include incomplete or damaged data so that the service provider can recover data from the data storage medium utilizing the described data recovery system.

The data recovery system may have an associated graphical user interface. The graphical user interface may be provided on a display or monitor, which may or may not be associated with the data recovery system. In other words, the data recovery system may have a dedicated display or monitor or may be accessible using any display or monitor. In either case, the data recovery system may provide instructions to generate and display the graphical user interface on the display device being used to access the data recovery system. The graphical user interface may also be updated and managed based upon instructions provided by the data recovery system. In other words, the data recovery system generates and transmits instructions to create and update the graphical user interface.

The graphical user interface may include a plurality of tabs, windows, and/or unique interfaces. The graphical user interface may include graphical user interface icons or elements. Graphical user interface icons or elements may include static non-selectable elements (e.g., headers, footers, logos, global information areas, graphics, etc.), dynamic non-selectable elements (e.g., local information areas applying to a specific element, dynamic graphics, information areas that update based upon the information provided therein, indicators, statistics displays, etc.), static selectable elements (e.g., radio buttons, menu icons, selectable indicators, etc.), dynamic selectable elements (e.g., form field input areas, pull-down menus, pop-up windows, etc.), and/or any other elements that may be found in a graphical user interface.

The graphical user interface may allow a user to provide input identifying information to be used by the data recovery system. For example, within the graphical user interface, the user can provide information related to a location of the data storage medium or instructions for accessing the data storage medium, the user can provide access to or instructions for accessing data recovered utilizing traditional data recovery techniques, the user can provide information related to the files to be recovered, a hallucination value for recovering the data, and/or other information that can define how the artificial intelligence model can recover the data, and/or the like. The use of user provided information is not the only way that the information may be provided to the artificial intelligence model or data recovery system.

For example, information for use by the system may be identified by the data recovery system as the system is utilized and inputs are provided to the system. As another example, any of the information may be entered by a user, may be default values, may be learned by the system over time, and/or the like. Thus, the information can be populated with information provided manually by a user, entities or companies, and/or the like, or can be populated over time as the system learns more about the data recovery, the data storage medium, the different files and file types, and/or the like. For example, a user may manually provide information or inputs and the system can learn about the data recovery and data predictions over time and populate the information used by the system with this learned information. With respect to the described data recovery system, the learned information may include information related to particular files and file types, information related to particular data storage mediums or data storage medium types, and/or the like. The data recovery system can then utilize these inputs, whether provided directly by the user or identified using a different technique, to perform the data recovery.

A user could also use the graphical user interface to adjust information within the system. Additionally, or alternatively, the user can input a location of information that may be useful to the system, provide a file corresponding to information related to the information, and/or the like, within the graphical user interface. Input may be provided by the user using any type of input modality, including, but not limited to, mechanical input (e.g., keyboard input, mouse input, etc.), touch input, audible or voice input, gesture input, haptic input, thought input, gaze input, electromyography input, virtual or augmented reality input, and/or the like.

The graphical user interface may also provide displays that display information of the system. It should be noted that the information to be used by the data recovery system and information provided by the data recovery system can be different for different applications, different computing systems, different users, and/or the like. Thus, the information corresponding to input or output of the data recovery system are not always the same. However, the data recovery system may have default or system-wide settings that are the same across different users, systems, applications, and/or the like, until the information is adjusted or otherwise changed.

It should be noted that different users may configure the graphical user interface per their preferences. Thus, the graphical user interface layout and configuration may be different between users. How much a user can configure the layout may be restricted or set by a system administrator and/or the like. Additionally, different users or different user roles may have different levels of access, which may also change how and what information is displayed. Thus, different graphical user interfaces may be displayed by the system.

The data recovery system may utilize one or more artificial intelligence models in identifying gaps in the data and generating a more complete set of data as compared to the incomplete stored data. Artificial intelligence models may also be used for steps within a step. For example, a model could be utilized to predict the gaps in the data to identify the gaps, a model can be utilized to generate data predictions to generate a set of data, and/or the like. For ease of readability, the majority of the description will refer to a single artificial intelligence model. However, it should be noted that an ensemble of artificial intelligence models or multiple artificial intelligence models may be utilized. Additionally, the term artificial intelligence model within this application encompasses neural networks, machine-learning models, deep learning models, artificial intelligence models or systems, and/or any other type of computer learning algorithm or artificial intelligence model that may be currently utilized or created in the future.

The artificial intelligence model may be a pre-trained model (e.g., a general model, such as a general classification model) that is fine-tuned for the data recovery system, or the artificial intelligence model may be a model that is created and trained from scratch. Since the data recovery system is used in conjunction with generating a more complete set of data, some models that may be utilized by the system are predictive models, byte stream models, image analysis models, text analysis models, audio analysis models, analysis models, similarity identification models, language models, large language models, entity identification models, input analysis models, filtering models, classification models, and/or the like. The model may be trained using one or more training datasets.

The training datasets may include a large number of storage data having high-level data information such as files, file contents, and/or the like, and low-level data information such as disk data stream information, and/or the like. The training dataset is not required to include organizational information, such as file structure information, and/or the like. However, this information could be included in the training dataset. In other words, it is not a strict requirement that organizational information is not included in the training dataset. Thus, the training dataset includes storage data with at least files and contents and disk data stream information.

The artificial intelligence model can be trained as a general data recovery model or can be trained as a unique data recovery model. The training dataset or datasets can then be based upon the type of recovery model. A unique artificial intelligence model may be unique to a particular file type (e.g., word processing files, binary program files, executable files, source code files, etc.), unique to a particular predictive and data recovery type (e.g., truncated files, files having gaps, etc.), unique to an amount or type of data that is recovered using traditional data recovery techniques (e.g., data having previous versions of files, data having data recovered using a particular recovery technique, etc.), and/or the like. The training dataset can then be unique to the type of the AI model. For example, for an AI model that is to be unique to a particular file type, the training dataset will be unique to that particular type of file. As a more specific example, if the AI model is to perform data recovery for word processing files, the training dataset will contain information for word processing files. The training dataset includes whole and good data, so once trained, the AI model can discern gaps and damaged sections from regular, good data, and make predictions regarding the data that should be utilized to fill in the gaps or address the damaged sections.

Additionally, as the model is deployed, it may receive feedback to become more accurate over time. Alternatively, or additionally, the model may utilize inputs provided to the model to learn continually, thereby using the inputs to make subsequent predictions or using the inputs within the subsequent predictions. The feedback or inputs may be automatically ingested by the model as it is deployed. For example, as the model is used to perform the described method, if a user modifies predictions that were made by the model, provides feedback regarding a prediction, or otherwise provides some indication that the predictions or selections made by the model may be incorrect, the model may ingest this feedback to refine the model.

On the other hand, as the model makes predictions in connection with performing the described steps, and no changes are made to the resulting prediction, the model may utilize this as feedback to further refine the model. This may be referred to as reinforcement training where a prediction that was made by the model is reinforced as the correct prediction. Training the model may be performed in one of any number of ways including, but not limited to, supervised learning, unsupervised learning, semi-supervised learning, training/validation/testing learning, active learning, transfer learning, weak supervision, data augmentation, weakly supervised learning, and/or the like. Accordingly, the training dataset may include annotated data, unannotated data, and/or the like, or a combination thereof.

Whether the model automatically ingests feedback during deployment or not may be determined by a user, author, and/or entity that has deployed the model. Automatic learning by the model may be useful in some applications, but may be detrimental in other applications. Accordingly, a user may make a determination regarding the trainability of the model during deployment. Regardless of whether the model can be retrained during deployment or is only retrained upon instruction by a user, the feedback or inputs could be stored within a data store and utilized at a later time to train or retrain the model. For example, a user could use the feedback to update a training dataset to train or retrain the model. The feedback or inputs could also be stored within the data store and then be used by the model for updated training. This may be done, for example, in an unsupervised learning session that allows the model to learn patterns and information regarding the training dataset without the need for human supervision, thereby providing at least a partially automated technique for the model to become updated. However, the model may or may not perform this retraining without a human providing input to the model to perform the retraining. In other words, retraining of the model may be based upon how the model is programmed and whether the model is updated while it is deployed or is only updated during a training mode may be based upon that programming.

As previously mentioned, an ensemble of models or multiple models may also be utilized. Some example models that may be utilized are variational autoencoders, generative adversarial networks, recurrent neural networks, convolutional neural networks, deep neural networks, autoencoders, random forest, decision tree, gradient boosting machine, extreme gradient boosting, multimodal machine learning, unsupervised learning models, deep learning models, transformer models, inference models, and/or the like, including models that may be developed in the future. The chosen model structure may be dependent on the particular task that will be performed with that model. Additionally, the feature sets, vectors, layers, outputs, and/or other characteristics of the model may be chosen by a user based upon the application.

The data recovery system may include different components for carrying out different functions of the system, including different steps to be performed. These components may be hardware components or software components. Some hardware devices or components that may be utilized by the data recovery system include input devices that may be utilized to receive input from the user, for example, mechanical input modalities (e.g., keyboard, mouse, etc.), touch input devices, gesture input devices, electromyography input devices, audio input devices, and/or the like. Other hardware components may be utilized to provide output from the data recovery system. For example, the data recovery system may include speakers, displays or monitors, haptic output devices, audio output devices, and/or the like.

Other hardware components may be included to capture images, for example, an image capture device, screen capture devices, and/or the like. Other hardware components may include data storage devices, including on devices of the user (e.g., mobile device, personal computer, laptop, tablet, smart watch, etc.), devices or components of the data recovery system, and/or the like. The data recovery system may also interface with hardware components of a device. For example, instead of the data recovery system including a display, the data recovery system may provide instructions to display content on a display component of a user device that is employing or communicating with the data recovery system.

One software component may include a data storage location or data repository that stores information for the data recovery system. Information may be stored in the data storage location using any data storage technique. Additionally, the system can access the information stored within the data storage location using any type of querying technique, filtering technique, and/or the like. The information within the data repository may be indexed for efficient information retrieval. The information contained within the data storage location may also be organized, for example, grouped by file type, grouped by data storage medium, grouped by training dataset, and/or the like. The information stored within the data repository may be indexed or grouped based upon multiple identifiers or other characteristics. Thus, the data repository can allow for filtering and sorting. The data repository may store information related to artificial intelligence models, for example, information identifying for what each model is trained, information related to how frequently a model has been used, information related to hallucination values, and/or the like.

At 301, the artificial intelligence model of the data recovery system receives data of a data storage medium. The data storage medium may be a damaged disk, meaning that not all the data stored on the data storage medium is accessible. Accordingly, the received data includes incomplete stored data. The incomplete stored data may include truncated data, data having damaged portions, data having corrupted portions, data having gaps, data having discontinuities, and/or the like. However, at least a portion of the data on the data storage medium needs to be accessible. Receipt of the data of the data storage medium may be accomplished using one or more data provision techniques, for example, a user uploading the data to the data recovery system, a user accessing the graphical user interface associated with the data recovery system and providing information to access the data and/or data storage medium, a user providing a link or pointer to a location of the data and/or data storage medium, and/or the like.

In addition to receiving the data of a data storage medium, or the damaged disk, the artificial intelligence model may also receive a recovered set of data of the data storage medium. The recovered set of data may include data that was recovered using traditional data techniques. This recovered set of data may include nothing, may include all the same information (e.g., all 1s, all 0s, all trash data, etc.), may include some data that was able to be recovered, and/or the like. The recovered set of data may assist the data recovery system in identifying gaps in the data and also assist the AI model in predicting data that should be used to fill the gaps or address any damaged sections of the incomplete stored data. Thus, the predictions generated by the artificial intelligence model to fill in gaps in the incomplete stored data can be at least partially based upon the recovered set of data, if it is useful to the AI model. Other data can also be received at the AI model, for example, previous versions of files. This information can additionally be used by the AI model to make the subsequent predictions.

At 302, the data recovery system may identify gaps in the data of the data storage medium. One technique for identifying the gaps is to utilize the recovered set of data. The gaps in the recovered set of data could be pre-identified using one of the traditional data recovery methods. Thus, the recovered set of data may identify the gaps within the data of the data storage medium. In other words, identifying the gaps in the data may include receiving the recovered set of data of the data storage medium that identifies the gaps based upon utilization of one of the traditional techniques for data recovery. Accordingly, identification of the gaps may be based upon the recovered set of data.

Another technique for identifying the gaps is to utilize the artificial intelligence model. Since the model is a model trained on good, complete data, the model is able to predict where the gaps exist in the incomplete data. In predicting the gaps, the model may not only identify actual gaps or discontinuities in the data, but may also identify truncated data, damaged data, corrupted data, and/or the like. In other words, the gaps in the data include any data location that is supposed to contain data but that is inaccessible, unable to be read, and/or missing. When identifying the gaps, the model may utilize the recovered set of data. For example, the model may identify gaps that can be filled with the recovered set of data and may then identify the gaps that have no additional information. Similarly, the model may utilize other data when identifying the gaps. Alternatively, or additionally, the recovered set of data and/or other data may only be used by the model in generating a more complete set of data. If the model is unable to identify any gaps in the data, the system may notify the user that no gaps in the data have been found. The system may additionally, or alternatively, stop the processing of the data storage medium.

When identifying gaps, the data recovery system may analyze the data storage medium as a whole, meaning the gaps may be identified on a data storage medium basis. Alternatively, or additionally, the data recovery system may access each file on the data storage medium and identify the gaps for each file. Some files may have more complete data as compared to other files on the data storage medium. The system may also identify the type of file, or other information about the file, that may be useful to the system. For example, by identifying the file type, the system may choose an artificial intelligence model to utilize in performing the gap identification and/or data predictions, with different models being used to process data having different file types.

In the case that multiple models are utilized, the data may be split based upon file types, or whatever characteristic is being used to determine what model to utilize, with the files having the designated characteristic being sent to the corresponding model. Alternatively, or additionally, the data may be provided to an ensemble of models with the models making the determination regarding which model will process what data. Alternatively, or additionally, the data may be provided to an ensemble of models, with the data being provided to each model and the model then will process the data if the model is trained on that data type or, alternatively, the model will either reject the data or provide an output that matches the input data if the model is unable to process that data type. Additionally, some files may include data having different characteristics in the same file. In this case, the data may be provided to the appropriate models, with each model processing the data that corresponds to that model. The outputs can then be aggregated. Additionally, the information about the file may be used when selecting characteristics of the artificial intelligence model, even if the same model is used for all data on the data storage medium.

The identified gaps may be utilized by the data recovery system to determine where data should be generated to make a more complete set of data. Thus, the system may determine if the artificial intelligence model can make predictions for data to fill the identified gaps at 303. In identifying if the model can make data predictions, the model may attempt to make the data predictions. The model takes the data from the data storage medium, any other data that was received at 301 (e.g., a recovered set of data, previous versions of files, etc.), and/or the like, processes the data, and outputs data predictions for the gaps that were identified at 302. The data predictions can be made by a single model, multiple models, an ensemble of models, and/or the like. The model(s) can process data for the data predictions in a manner similar to how the gaps were identified, meaning the files can be split before provision to the model, the data can be provided to the ensemble and the ensemble makes the model selection, the data can be provided to all models, and/or the like.

The data predictions may vary based upon the file type or other characteristics of the file (e.g., how much data was recovered for the file using conventional techniques, how the data is inaccessible (e.g., truncated, discontinuities, gaps, damaged, corrupted, etc.), whether previous file versions are accessible, etc.). Not only can the file characteristics drive which model is utilized for the data predictions, if multiple models are being utilized for different data, but it can also drive the characteristics of the model that are used. One characteristic of the model may be a hallucination value. The hallucination value identifies an amount by which the artificial intelligence model can hallucination information to be utilized as the data predictions. In other words, the hallucination value tells the model how much information it is allowed to hallucinate when making the data predictions. The hallucination value may be set by a user, may be a default value, set by a requesting entity, may be learned by the system over time, and/or the like.

Different types of files or data may be more or less sensitive to hallucinated information as compared to different types of files or data. In other words, for some types of data, the data has to be exact or very close to the original data in order to make it function like the original data (i.e., the data that was created before the data was made incomplete). On the other hand, for some types of data, the data can be less similar to the original data and still function like the original data. For example, source code can be written in many different ways and still perform the same function. Thus, whether the source code is written exactly as the original is not as important as merely written to perform the same function. As a contrasting example, binary files are very sensitive to data changes. Thus, if a binary file is different than the original file, it will likely not function like the original, or may not even function at all.

Since the hallucination value allows the model to effectively make up data, some files will be sensitive to making up data, whereas other files will not be as sensitive. Accordingly, the hallucination value can vary or be dependent upon the data for which the system will be making data predictions. Thus, the hallucination value may be dependent on the file type, or other file characteristic, and can also vary across the set of incomplete stored data. Other characteristics of the model that may vary based upon the file characteristics includes, but is not limited to, how much the model relies on any other information that was received at 301 (e.g., recovered set of data, previous versions of data, etc.), whether the user is informed of how much data was hallucinated, and/or the like.

If, at 303, the artificial intelligence model cannot make predictions for data to fill the gaps, the system may take no action with respect to that gap at 305. Additionally, or alternatively, if the model cannot make a prediction, it may inform a user that a prediction cannot be made at 305. Thus, the user may be notified of the inability to make data predictions for particular gaps within the data. The user may then make some changes to the characteristics of the model in order to fill in the gaps that were unable to be filled, for example, changes to the hallucination value, selection of a different AI model, and/or the like. If the user makes changes, the system may reprocess the data based upon the changes the user made. It should be noted that the model may be able to make predictions for some gaps, but not all gaps. Thus, the model, if unable to make a prediction, may move to the next gap and try to fill in that gap with a data prediction. This iterative process may continue until the model has processed all identified gaps in the data, even if not all the gaps can be filled with data predictions.

If, on the other hand, the artificial intelligence model can make predictions for data to fill the gaps, the system may generate a set of data corresponding to a more complete set of the incomplete data at 304. In other words, the artificial intelligence model may generate a set of data corresponding to a more complete set of the incomplete stored data by adding data predictions that are generated by the model for the gaps in the data to the incomplete stored data. Stated differently, the model makes data predictions for the gaps and fills in the gaps with the data predictions, which results in a more complete set of data as compared to the incomplete stored data that was received at 301. It should be noted that the data set may not be a complete data set as there may still be some gaps, but it is more complete as compared to the data that was received at 301.

A completeness of the set of data may be based at least in part on the hallucination value of the model as it made data predictions. Since the hallucination value may vary depending on file characteristics, the completeness of the set of data may also be based upon those same file characteristics. For example, a set of data having a high percentage of executable files may be less complete than a set of data having a high percentage of user created files, due to a difference in hallucination values for each of those file types. The generated data set may not exactly match the original data (the data that was created before it was made inaccessible), but the intent is to make it function as the original data functioned. Thus, the described system is able to recover data from a damaged disk by predicting data that is incomplete, unable to be accessed, is unreadable, and/or the like.

Once the set of data is generated by the data recovery system, the data recovery system may notify the user that is has been generated and it can be provided to a user, for example, through the graphical user interface, by storing it in a data storage location, and/or the like. In the case that data was hallucinated by the model, the user may also be notified of how much data was hallucinated, the files that include hallucinated data, the files that could not be recovered, and/or the like.

Figure 4:
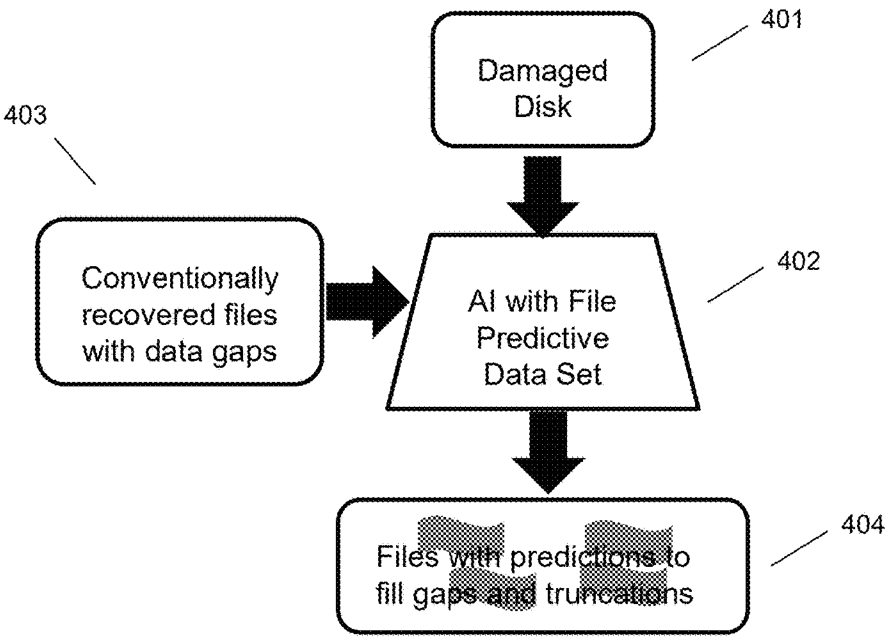
FIG. 4 illustrates an example flowchart of utilizing an artificial intelligence model for data recovery.

An overall, a non-limiting example is illustrated in FIG. 4. FIG. 4 illustrates an example flowchart of utilizing an artificial intelligence model for data recovery. The artificial intelligence model trained for generating a file predictive data set 402 is provided with a damaged disk 401. The damaged disk includes incomplete stored data, which may include damaged data, data with gaps, data having discontinuities, truncated data, data having corrupted portions, and/or the like. The AI model 402 may also be provided with any files that have been recovered using conventional data recovery techniques and that still include data gaps 403. The AI model 402 can use this information to assist in the making the predictions of gaps within the data from the damaged disk 401 and in making the predictions of data to be used to fill the gaps. Once these predictions are made, the AI model 402 returns files with predictions to fill the gaps and truncations 404. The returned files 404 represent a set of data that is more complete than the set of incomplete stored data that was on the damaged disk 401.

It will be readily understood that the components of the embodiments, as generally described and illustrated in the figures herein, may be arranged and designed in a wide variety of different configurations in addition to the described example embodiments. Thus, the more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

As will be appreciated by one skilled in the art, various aspects may be embodied as a system, method, or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

It should be noted that the various functions described herein may be implemented using instructions stored on a device readable storage medium such as a non-signal storage device that are executed by a processor. A storage device may be, for example, an electronic, magnetic, optical, electromagnetic, infrared, or semiconductor system, apparatus, or device, or any suitable combination of the foregoing. More specific examples of a storage medium would include the following: a portable computer diskette, a hard disk, a random-access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a storage device is not a signal and is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire. Additionally, the term "non-transitory" includes all media except signal media.

Program code embodied on a storage medium may be transmitted using any appropriate medium, including but not limited to wireless, wireline, optical fiber cable, radio frequency, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider), through wireless connections, e.g., near-field communication, or through a hard wire connection, such as over a USB connection.

Example embodiments are described herein with reference to the figures, which illustrate example methods, devices, and program products according to various example embodiments. It will be understood that the actions and functionality may be implemented at least in part by program instructions. These program instructions may be provided to a processor of a device, a special purpose information handling device, or other programmable data processing device to produce a machine, such that the instructions, which execute via a processor of the device implement the functions/acts specified.

It is worth noting that while specific blocks are used in the figures, and a particular ordering of blocks has been illustrated, these are non-limiting examples. In certain contexts, two or more blocks may be combined, a block may be split into two or more blocks, or certain blocks may be re-ordered or re-organized as appropriate, as the explicit illustrated examples are used only for descriptive purposes and are not to be construed as limiting.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method, the method comprising:

receiving, at an artificial intelligence model of a data recovery system, data of a data storage medium comprising incomplete stored data;

identifying, using the data recovery system, gaps in the data of the data storage medium; and generating, using the artificial intelligence model, a set of data corresponding to a more complete set of the incomplete stored data by adding data predictions, generated by the artificial intelligence model, for the gaps in the data to the incomplete stored data.

2. The method of claim 1, comprising receiving, at the artificial intelligence model, a recovered set of data of the data storage medium, wherein the recovered set of data comprises an incomplete recovery of the data, and wherein the predictions generated by the artificial intelligence model are at least partially based upon the recovered set of data.

3. The method of claim 1, wherein the identifying is based upon gaps identified within a received recovered set of data.

4. The method of claim 1, wherein the artificial intelligence model comprises a trained predictive artificial intelligence model trained utilizing a training dataset comprising storage data comprising files and contents and disk data stream information.

5. The method of claim 4, wherein the training dataset is unique to a particular type of file.

6. The method of claim 1, wherein a completeness of the set of data is based in part on a hallucination value, wherein the hallucination value identifies an amount that the artificial intelligence model can hallucinate information to be utilized as the data predictions.

7. The method of claim 6, wherein the hallucination value is dependent on a file type of the incomplete stored data.

8. The method of claim 6, wherein the hallucination value can vary across the set of incomplete stored data.

9. The method of claim 1, comprising providing the set of data to a user of the data recovery system.

10. The method of claim 1, wherein the incomplete stored data comprises at least one of: data having damaged portions, data having corrupted portions, data having gaps, and data having discontinuities.

11. A system, the system comprising:

a processor;

a memory device that stores instructions that, when executed by the processor, causes the system to:

receive, at an artificial intelligence model of a data recovery system, data of a data storage medium comprising incomplete stored data;

identify, using the data recovery system, gaps in the data of the data storage medium; and generate, using the artificial intelligence model, a set of data corresponding to a more complete set of the incomplete stored data by adding data predictions, generated by the artificial intelligence model, for the gaps in the data to the incomplete stored data.

12. The system of claim 11, comprising receiving, at the artificial intelligence model, a recovered set of data of the data storage medium, wherein the recovered set of data comprises an incomplete recovery of the data, and wherein the predictions generated by the artificial intelligence model are at least partially based upon the recovered set of data.

13. The system of claim 11, wherein the identifying is based upon gaps identified within a received recovered set of data.

14. The system of claim 11, wherein the artificial intelligence model comprises a trained predictive artificial intelligence model trained utilizing a training dataset comprising storage data comprising files and contents and disk data stream information.

15. The system of claim 14, wherein the training dataset is unique to a particular type of file.

16. The system of claim 11, wherein a completeness of the set of data is based in part on a hallucination value, wherein the hallucination value identifies an amount that the artificial intelligence model can hallucinate information to be utilized as the data predictions.

17. The system of claim 16, wherein the hallucination value is dependent on a file type of the incomplete stored data.

18. The system of claim 16, wherein the hallucination value can vary across the set of incomplete stored data.

19. The system of claim 11, comprising providing the set of data to a user of the data recovery system.

20. A product, the product comprising:

a computer-readable storage device that stores executable code that, when executed by a processor, causes the product to:

receive, at an artificial intelligence model of a data recovery system, data of a data storage medium comprising incomplete stored data;

identify, using the data recovery system, gaps in the data of the data storage medium; and generate, using the artificial intelligence model, a set of data corresponding to a more complete set of the incomplete stored data by adding data predictions, generated by the artificial intelligence model, for the gaps in the data to the incomplete stored data.

* * * * *